United States Patent
Ripperger et al.

(10) Patent No.: US 7,649,154 B2
(45) Date of Patent: Jan. 19, 2010

(54) METHOD OF PRODUCING A GRAPHIC ELEMENT

(75) Inventors: Joachim Ripperger, Unterfoehring (DE); Tilman von Hacht, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 345 days.

(21) Appl. No.: 11/450,438

(22) Filed: Jun. 12, 2006

(65) Prior Publication Data

US 2006/0286307 A1 Dec. 21, 2006

Related U.S. Application Data

(63) Continuation of application No. PCT/EP2004/012511, filed on Nov. 5, 2004.

(30) Foreign Application Priority Data

Dec. 11, 2003 (DE) .............................. 103 58 313

(51) Int. Cl.
  *B23K 26/00* (2006.01)
  *B23K 26/36* (2006.01)
  *B23K 26/40* (2006.01)
(52) U.S. Cl. .................. 219/121.69; 427/555; 427/556; 430/292; 430/295
(58) Field of Classification Search ..............................
     219/121.67–121.72, 121.85; 427/554, 555, 427/556; 430/270.1, 275.1, 292, 295
See application file for complete search history.

(56) References Cited

U.S. PATENT DOCUMENTS

| | | | | |
|---|---|---|---|---|
| 3,663,793 | A * | 5/1972 | Petro et al. ............. | 219/121.69 |
| 3,679,818 | A * | 7/1972 | Courtney-Pratt ............ | 358/508 |
| 5,175,043 | A * | 12/1992 | Yabe et al. .................. | 428/156 |
| 5,346,802 | A * | 9/1994 | Ohbachi et al. .......... | 430/270.1 |
| 5,632,914 | A * | 5/1997 | Hagenow et al. ....... | 219/121.71 |
| 5,745,660 | A * | 4/1998 | Kolpatzik et al. .......... | 358/3.19 |
| 5,940,115 | A | 8/1999 | Nakamura et al. | |
| 5,961,143 | A * | 10/1999 | Hlywka et al. ........... | 280/728.3 |
| 6,169,266 | B1 * | 1/2001 | Hughes ................. | 219/121.68 |
| 6,576,862 | B1 * | 6/2003 | Costin et al. ............. | 219/121.6 |
| 6,984,803 | B1 * | 1/2006 | Garnier et al. ......... | 219/121.82 |
| 7,246,824 | B2 * | 7/2007 | Hudson ....................... | 283/91 |
| 7,374,609 | B2 * | 5/2008 | Bujard et al. ............ | 106/31.65 |
| 2001/0052924 | A1 | 12/2001 | Steinke et al. | |

(Continued)

FOREIGN PATENT DOCUMENTS

DE    41 09 532 A1    10/1991

(Continued)

OTHER PUBLICATIONS

International Search Report dated Mar. 30, 2005 (Three (3) pages).

(Continued)

*Primary Examiner*—Samuel M Heinrich
(74) *Attorney, Agent, or Firm*—Crowell & Moring LLP

(57) ABSTRACT

In the case of a method of producing a linear graphic element on a molded body, the molded body is metallically coated and the graphic element is produced by a laser irradiation. The coating is removed by the laser irradiation in the form of dots having the same diameter and the same mutual spacing.

14 Claims, 1 Drawing Sheet

U.S. PATENT DOCUMENTS

| | | | |
|---|---|---|---|
| 2002/0011641 A1* | 1/2002 | Oswald et al. | 257/447 |
| 2006/0181077 A1* | 8/2006 | Kaule et al. | 283/72 |
| 2007/0032569 A1* | 2/2007 | Langdon et al. | 523/136 |

FOREIGN PATENT DOCUMENTS

| | | | |
|---|---|---|---|
| DE | 44 41 337 A1 | 5/1996 |
| DE | 195 11 977 C2 | 5/1997 |
| DE | 196 40 549 A1 | 4/1998 |
| DE | 196 44 620 A1 | 4/1998 |
| DE | 42 12 423 C2 | 8/2001 |
| DE | 101 14 588 A1 | 10/2002 |
| DE | 101 55 906 A1 | 5/2003 |
| EP | 000981966 A2 * | 3/2000 |
| JP | 53000703 A * | 1/1978 |
| JP | 2000-6597 A | 1/2000 |
| JP | 2000-141630 A | 5/2000 |
| JP | 2000-212760 A | 8/2000 |

OTHER PUBLICATIONS

German Search Report dated Jul. 29, 2004 with and English translation of the pertinent portion (four (4) pages).

* cited by examiner

METHOD OF PRODUCING A GRAPHIC ELEMENT

CROSS-REFERENCE TO RELATED APPLICATIONS

This application is a continuation of PCT International Application No. PCT/EP2004/012511, filed on Nov. 5, 2004, which claims priority under 35 U.S.C. §119 to German Application No. 103 58 313.0, filed Dec. 11, 2003, the entire disclosures of which are expressly incorporated by reference herein.

BACKGROUND AND SUMMARY OF THE INVENTION

The invention relates to a method of producing a linear graphic element on a molded body.

The molded body may, for example, be an operating element, a decorative design element or a display element, which are used for many different purposes. The linear graphic element may be a line, a straight line, or a figure which is closed in itself, such as a rectangle. By means of this figure, a design can also be achieved which acts as a bordering of a letter and can thereby be displayed as a letter.

In this context, a method of producing operating elements, decorative design elements or display elements, is known from German Patent document DE 42 12 423 C2, in the case of which a non-transparent layer, which is applied to a basic body, is removed by use of laser irradiation for producing a symbol. In this case, the layer is completely removed. Areas with or without coating, which visually can be clearly differentiated from one another, are present on the basic body. The laser is used only as a tool here, by which the coating is rapidly and completely removed. The faster the removal of the coating takes place, the shorter the machining time. The defining of a short machining time thus requires an energy-intensive machining of the coating and, therefore, involves the risk of damaging the basic body. This leads to a non-uniform visual appearance of the symbol.

This poor visual impression is further intensified if the element graphic should be recognizable also under less favorable light conditions, particularly in darkness. A person skilled in the art knows this design in the case of operating elements under the name of "night design". For this purpose, it is known from German Patent document DE 42 12 423 C2 to shine a light source behind the basic body, so that the light can emerge through the places which are free of coating. Damage to the basic body in these areas has the visual appearance of dirt.

It is an object of the invention to improve the above-described method such that the graphic element has a uniform appearance when under different lighting conditions, and which method permits a fast and process-reliable production.

This object is achieved by a method of producing a linear graphic element on a molded body, wherein the molded body is metallically coated, and the graphic element is produced by a laser irradiation by which the coating is removed in the form of dots.

Other objects, advantages and novel features of the present invention will become apparent from the following detailed description of the invention when considered in conjunction with the accompanying drawings.

DETAILED DESCRIPTION OF THE DRAWINGS

Figure 1:
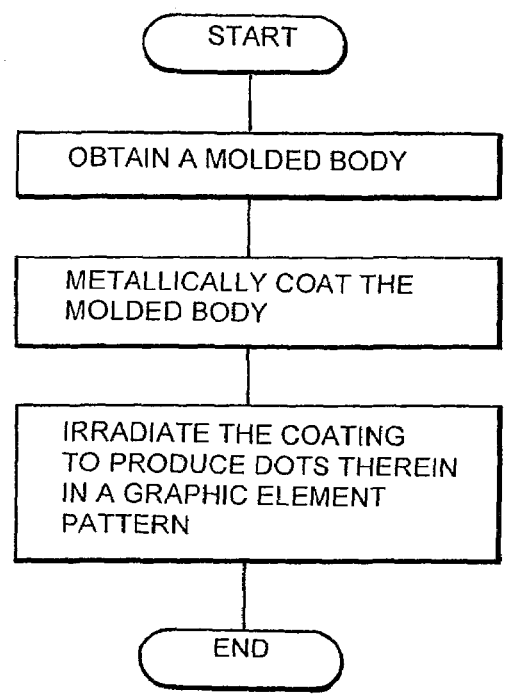
FIG. 1 is a flow chart illustrating the method of producing a linear graphic element on a molded body according to the present invention.
Figure 2:
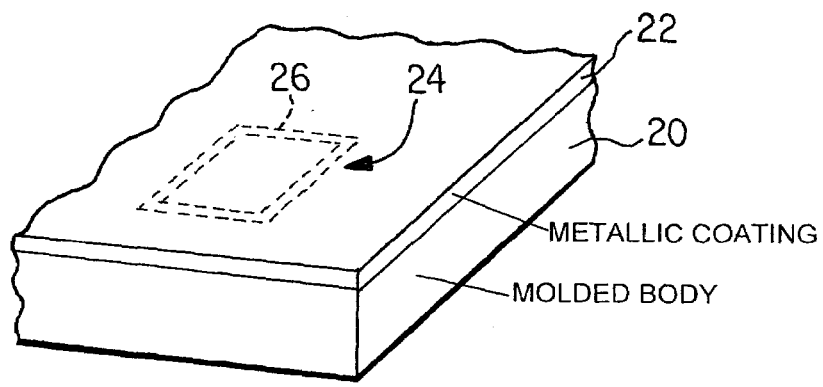
FIG. 2 is a perspective view of a molded body formed in accordance with the present invention.

Referring to FIGS. 1 and 2, the method according to the present invention starts (step 10) by obtaining a molded body (step 12). The molded body is provided with a metallic coating (step 14). Then, the linear graphic element is produced by use of laser irradiation by which the metallic coating is removed in a dot form (step 16). Once the irradiation is completed, the process finishes (step 18). FIG. 2 provides a perspective and cross-section views of a molded body 20 having the metallic coating 22. The linear graphic element 24 is shown, for example, as a rectangle. The graphic element 24 is produced by irradiating the coating 22 to remove dot shaped portions 26 of the coating 22.

The molded body is directly coated metallically. Some type of intermediate layer between the molded body and the coating, as provided in German Patent document DE 42 12 423 C2, is not absolutely necessary. The graphic element is generated by a laser irradiation, which removes the coating in a pixel-shaped manner. Only dots are always removed. The energy required for this purpose and, therefore, the danger of damaging the basic body is extremely low. If the mutual spacing of the dots is identical and if the dots have the same diameter, a uniform visual impression of the graphic element and, as a result, a particularly good perceptibility and readability are obtained under all lighting conditions.

The diameter of the individually produced dot, and its distance to the next dot, may be varied within wide ranges. A particularly good visual impression is obtained if the individual dots are not discernible by the human eye at a normal reading distance of approximately 30 cm.

By using the method according to the present invention, a surface impression can also be produced. For this purpose, the dots generated by use of laser irradiation are arranged in a surface-shaped manner and at the same mutual distance. This variant of the method according to the invention is similar to newspaper print, in the case of which a surface impression can be obtained by a dense and uniform arrangement of print pixels.

As a result, surfaces of a different brightness can also be produced by changing the packing density of the generated dots.

Similarly to German Patent document DE 42 12 423 C2, it is also contemplated to illuminate the graphic elements from behind. For this purpose, the molded body consists of a transparent material and is illuminated on the side facing away from the coating. A special color effect can be achieved, for example, in that the molded body has the special coloring and is transilluminated by way of colorless light, or if the molded body is colorless itself, the illumination may take place in the desired color. A colored effect is also created if the plastic material of the molded body is machined in an identical manner in each dot when removing the coating. Depending on the intensity of the irradiation, a bronzing effect of the graphic element occurs which is visible in incident light and in transmitted light and is caused by the release of individual carbon atoms.

With respect to its intensity, this bronzing effect, that is, the browning effect in conjunction with the reflectance in incident light, is variable and dependent on the intensity of the laser irradiation. This, on the one hand, results in a removal of the coating in a punctiform manner. Depending on the density and the size of the dots, an adjustable dulling of the surface is obtained. In addition, a variable browning effect is obtained as a function of the intensity of the irradiation.

In the case of a colorless molded body, symbols, letters, etc. of different colors may be obtained by illuminations in different colors. If the material of the molded body is selected to be colorless, milky or opaque, many different visual effects can be achieved in connection with the arrangement and the further development of the machining points.

If the coating of the molded body is implemented to be a shiny silver-metallic, the graphic element has a darker effect in incident light, but is brighter than the remaining molded body in transmitted light, which results in additional multiple visual design possibilities.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a linear graphic element on a molded body, the method comprising the acts of:
   metallically coating a surface of the molded body;
   forming dots in the metallic coating by using laser irradiation to remove dot shaped portions of the metallic coating thereby exposing dot shared portions of the molded body, wherein the formed dots produce the graphic element; and
   machining, using laser irradiation, the molded body within the exposed dot shaped portions of the molded body to release individual carbon atoms from the irradiated portions of the molded body to produce a bronzing effect on the graphic element.

2. The method according to claim 1, wherein the dots include a plurality of dots having substantially a same diameter and having a same mutual spacing therebetween.

3. The method according to claim 1, wherein the laser irradiation is carried out such that an individual generated dot and its distance from an adjacent dot is not discernible by a human eye at a normal reading distance.

4. The method according to claim 2, wherein the laser irradiation is carried out such that an individual generated dot and its distance from an adjacent dot is not discernible by a human eye at a normal reading distance.

5. The method according to claim 1, wherein, for generating an impression of a surface, the dots produced by the laser irradiation are arranged in a surface-shaped manner and at a same mutual distance.

6. The method according to claim 2, wherein, for generating an impression of a surface, the dots produced by the laser irradiation are arranged in a surface-shaped manner and at a same mutual distance.

7. The method according to claim 3, wherein, for generating an impression of a surface, the dots produced by the laser irradiation are arranged in a surface-shaped manner and at a same mutual distance.

8. The method according to claim 1, wherein a packing density of the generated dots is changed for producing surfaces of a different brightness.

9. The method according to claim 2, wherein a packing density of the generated dots is changed for producing surfaces of a different brightness.

10. The method according to claim 3, wherein a packing density of the generated dots is changed for producing surfaces of a different brightness.

11. The method according to claim 4, wherein a packing density of the generated dots is changed for producing surfaces of a different brightness.

12. The method according to claim 1, wherein as a function of at least one of an intensity of the laser irradiation, and a density and/or size of the irradiation dots, a matting effect of a surface and/or a browning effect is variably adjusted.

13. The method according to claim 1, wherein the molded body is a transparent material, which is illuminated on a side facing away from the metallic coating.

14. A method of producing a linear graphic element on a molded body, the method comprising:
    metallically coating a surface of the molded body of a plastic material; and
    forming dots in the metallic coating by using laser irradiation to remove dot shaped portions of the metallic coating, wherein the intensity of the laser radiation is selected to remove the portions of metallic coating in a punctiform manner, wherein an arrangement of the formed dots forms the graphic element, and
    wherein the intensity of the laser irradiation is selected to produce a bronzing effect in the plastic material at the formed graphic element.

* * * * *

UNITED STATES PATENT AND TRADEMARK OFFICE
CERTIFICATE OF CORRECTION

PATENT NO. : 7,649,154 B2
APPLICATION NO. : 11/450438
DATED : January 19, 2010
INVENTOR(S) : Ripperger et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

Signed and Sealed this

Twenty-eighth Day of December, 2010

David J. Kappos
*Director of the United States Patent and Trademark Office*